Patented May 31, 1949

2,471,899

UNITED STATES PATENT OFFICE 2,471,899

METHOD OF SEPARATING CONSTITUENTS OF ALLOYS BY FRACTIONAL CRYSTALLIZATION

Albert Regner, Prague, Czechoslovakia, assignor to Spolek pro chemickou a hutní vyrobu národní podnik-United Chemical and Metallurgical Works National Corporation, Prague, Czechoslovakia, a Czechoslovak company No Drawing. Application March 1, 1947, Serial No. 731,872. In Czechoslovakia July 8, 1940

Section 1, Public Law 690, August 8, 1946
Patent expires July 8, 1960

2 Claims. (Cl. 75—63)

It is known that some alloys can be separated by means of fractional crystallization of molten alloy into two or more phases having different freezing points. During this process, the molten alloy is allowed to cool and the higher melting phase of the alloy migrates in the direction of the thermal gradient to the cooler peripheral zone of the molten body, hereinafter referred to as the melt, where it solidifies in the form of a scale or layer of solid phase. In the remainder of the melt or liquid phase, the lower melting point phases are concentrated and are then removed from the solid phase before the entire melt solidifies. As the distance between the center of the melt and the cooler peripheral zone is very great, the diffusion of the migrating phases requires a long time. Therefore, it would be necessary to cool the melt extraordinary slowly, lest the diffusing phase should solidify on its long path before it reaches the peripheral zone where its separation in solid form is to be effected.

In industrial practice, the speed of cooling is never low enough and some quantity of higher melting phase separates in the center of the melt before it reaches the periphery. After solidification, the crystals segregated can be separated later on the periphery, i. e. they can float up to the surface of the melt or sink to the bottom, only where their specific gravity differs substantially from the specific gravity of the liquid phase. For this reason, the described method is confined only to separation of such alloys the phases of which are of different specific gravity. It is evident that the effect of such a separation process is not quite satisfactory as the sinking or floating of solid phase entrains a considerable amount of liquid phase so that the solid layer obtained is very much enriched with included lower melting phase of liquid phase. To increase the yield of liquid phase, a systematic and repeated treatment of solid phase would be required.

It has now been found that the separation process can be considerably accelerated and the purity of the liquid phase increased if during the treatment the molten alloy is kept in intensive continuous movement and so much heat per unit of time is abstracted from the melt by means of a cooled surface, that is a crystallization surface, provided for this purpose, that the entire higher melting phase separates only on the crystallization surface in a relatively short time and in the form of a very compact layer. If the heat accumulated in the melt and surrounding masonry before the start of the process proves to be insufficient, thus cooling the melt too quickly, additional heat is applied at points remote from the crystallization surface.

It has been said that in the stationary crystallization of a melt the higher freezing phases of the alloy are transferred from the center of the melt to its periphery only by way of diffusion, which is a very slow process owing to the great distance and to the fact that both the temperature and the concentration gradients are low. On the contrary, with an effectively stirred melt, the separating phase is transferred in the whole body of the melt by way of convection as quickly as possible, and diffusion occurs only in the so-called film, existing in the immediate vicinity of the crystallization surface. Since the film is very thin and since the temperature gradient and the concentration gradient are both substantially elevated owing to the relatively high abstraction of heat from the melt, the diffusion process proceeds at such a velocity that the separation of the alloys can be effected within a very short time.

In contradistinction to the known processes in which the result of the treatment is better when the temperature difference between the crystallizing solid phase and the center of the remaining melt is as small as possible, according to the present invention it was recognized firstly that a relatively high temperature drop amounting to from 5° to 20° C. created in consequence of the intensive abstraction of heat from the melt in the film, on the boundary between the crytsallization surface and the melt produces besides the already mentioned possibility of shortening the duration of the separation process, still further unexpected results in the higher purity of both the remaining liquid and solid phase.

The film with its steep temperature drop divides the entire volume of the melt under treatment sharply into two regions. One of them is the molten alloy, the other is the zone of the crystallized solid phase. The latter zone adjoins immediately the intensively cooled surface assisting in the formation of a great number of crystal nuclei so that the separated solid phase consists merely of very fine crystals. As the region of the crystallization in which the temperature of solidification is reached is inconsiderable in relation to the entire volume of the alloy to be treated, the small crystals forming have to be packed close together, so that practically all the liquid phase is forced out of the solid phase. It was not known before that the formation of fine crystals can be advantageously used for improving the result of the separation. As known, the previous practice sought to avoid the formation of such minute crystal units because the losses of the included liquid phase retained in the numerous interspaces and cavities of the same were very considerable, if such crystal units were produced as separated units in the body of melt.

There is still one more advantage of the steep temperature drop in the film. The temperature of crystallization, as already stated, is reached in the crystallization zone only, whereas the temperature in the liquid phase, being practically uniform in the whole body, is kept higher by the value of the temperature drop. Therefore, there is no danger of any local solidification of liquid phase even if during the cooling the temperature in the crystallization zone has been lowered as far as the outside temperature of the alloy. Having this advantage in view, the new method gives much better yields than other known processes particularly in the isolation of eutectic alloys.

According to the invention in the separation of an alloy, the procedure is substantially as follows:

The completely molten alloy is allowed to cool with continuous stirring, the abstraction of heat by means of the crystallization surface and the speed of cooling being properly related to one another to prevent solidification in the body of the melt and to obtain the best yield from the process. When the temperature of the freezing point of the desired phase of the molten alloy is reached on the crystallization surface, the higher melting phase begins to freeze out and produce a solid phase. As the temperature becomes lower, the solid phase continues to separate and the remaining liquid phase becomes richer in lower melting phase. As soon as the liquid phase reaches the desired composition, the cooling is stopped and the separated solid phase is removed from the remaining melt.

During the procedure so much heat is abstracted from the melt through the crystallization surface that a relatively high temperature drop occurs on the boundary between the melt and the crystallization surface, that is in the film. This difference in temperature is maintained from 5° to 20° C., say about 10° C. In order to keep such a temperature drop, the heat accumulated in the molten alloy and in the masonry of the furnace is sufficient in some cases; otherwise, if the metallic melt is a good heat conductor, it is necessary to heat the melt at points remote from the crystallization surface.

The course of the crystallization and separation process is advantageously conducted according to the indication of a thermometer dipping into the melt. If the equilibrium diagram of the alloy to be treated is known, the composition of the remaining liquid phase can be continuously followed. It must be remembered, however, that equilibrium between solid phase and liquid phase is established only in the crystallization zone, so that the measured temperature in the melt is higher by the temperature drop existing in the film than the equilibrium temperature. The value of this temperature drop in the given case can be easily ascertained by experiment.

The motion of the melt produces sufficient convection currents so that at any instant the composition in the main body of liquid phase and its temperature are uniform throughout the whole body of the melt. It has been found that the layer of solid phase separated on the crystallization surface is more compact and poorer in included liquid phase the more rapid is the movement of the melt. In use on an industrial scale certain limits will be imposed on this movement in view of the substantial risk of oxidation of the metal and splashing of the melt. If in technical practice the motion in the melt is produced by means of a stirrer, the stirrer performs between 50 and 400 revolutions per minute according to the size of the equipment.

It has been further ascertained that a smaller crystallization surface gives better results as regards the yield of liquid phase than a larger one. But if a satisfactory result of crystallization on a smaller crystallization surface is to be obtained, a more powerful means for cooling down the crystallizer must be used for instance running water.

When separating alloys according to the invention, the speed of cooling the melt must not increase beyond a certain maximum, above which the solid phase does not separate only on the crystallizer, but partly also in the body of the melt in the form of minute crystals. This maximum speed of cooling depends both on physical and chemical qualities of the alloy and on the intensity of stirring and amount of heat extracted from the melt through the crystallization surface. In the given process the most advantageous condition can be easily ascertained by an experiment.

The separation according to the invention is in practice effected by means of a furnace which is equipped with a device for effecting the necessary movement of the melt and in which the necessary abstraction of heat from the melt is rendered possible by a crystallization surface of a suitably chosen crystallizer in contact with the melt. Preferably, there is used for this purpose a crucible furnace heated by means of gaseous, liquid or solid fuel, or by an electric resistance or inductively. Further, for this purpose, there may also be used a built-in well-insulated pan which is preheated and subsequently filled with a molten alloy. In the crystallization process the pan unit is, if desired, additionally heated by combustion of gas or by an electric arc or by a resistance immersed in the melt or arranged above the melt.

The crystallizer used is so mounted that the flow of the melt effected by stirring is directed towards it, the melt being kept at the required temperature by reason that on its travel it passes through a heating zone. The crystallizer may be fitted directly in the wall or in the bottom of the refining vessel, the respective surface being cooled from the outside, for example, by means of a cooling coil mounted in the masonry. With the same effect, there may be used as a crystallizer a hollow cylinder which dips into the bath of melt and which is cooled internally by means of a gas, a spray of liquid or a stream of water.

The movement of the bath is effected either by means of a mechanically operated stirrer or by means of an alternating or rotary magnetic field which is set up by means of an alternating current coil surrounding the crucible. In certain cases, there may be used an alternating or rotary magnetic field, whereby also heat is induced in the melt by eddy currents.

As an advantageous solution of the problem there has been used a combination in which the crystallization surface is provided at the bottom of the crucible and the heating body is mounted above the bath level, the bath being set in movement either mechanically or by the action of a changing magnetic field. After the finish of the process, the liquid is first poured off and the solid adhering to the bottom of the crucible is either melted out or broken out.

According to a modification, the mechanically operated stirrer can also be used as a crystallizer, if the stirrer is formed hollow and cooled internally by means of air, water or other cooling medium. After the finish of the process, the stirrer is lifted out of the melt and the solid layer clinging thereto is mechanically loosened from the wall of the crystallizer. The liquid is then poured from the furnace or removed by tapping or running off.

As already stated, the result of the new separation process as to the yield and the purity of isolated liquid phase as well as the speed of crystallization is much better than that of known stationary fractional crystallization. The obtained solid phase is already after a single operation so concentrated in the higher melting phase that any further treatment for increasing the yield of liquid phase is unnecessary. In this respect, the new process is superior to other known processes proposed for separating of alloys such as separation of solid phase by means of filtration, centrifuging or decantation.

EXAMPLES

*Example 1.—Production of a tin alloy*

200 kg. of alloy of the following composition:

| | Per cent |
|---|---|
| Tin | 53.04 |
| Lead | 32.20 |
| Antimony | 12.08 |
| Copper | 2.46 | were according to the present invention subjected to fractional crystallization in the range of temperature between 340° and 192° C. The last named temperature is 10° above the melting point of the ternary eutectic Sn—Pb—Sb. During the entire operation which lasted for 6 hours, the melt was kept in lively movement by a stirring device performing 110 revolutions per minute. Through the walls of the stirring device 5000 calories were abstracted per hour and the melt was so heated externally that the velocity of its cooling amounted to 25° C. per hour. The difference between the temperature of the melt and that of the cooling walls amounted to 10° C. After attainment of the final temperature of 192° C., the mixing device was lifted out and the alloy clinging thereto removed. The amount of the residual melt was 144 kgs., that is, 72% of the initial alloy. The composition of the residual melt was the following:

| | Per cent |
|---|---|
| Tin | 54.05 |
| Lead | 41.50 |
| Antimony | 3.55 |
| Copper | 0.15 |

The yields obtained were considerably greater than those which were obtained by known processes of fractional crystallization of alloy of the same composition. The known process took 60 hours and gave 48% of a final melt of the following composition:

| | Per cent |
|---|---|
| Tin | 54.40 |
| Lead | 41.50 |
| Antimony | 3.67 |
| Copper | 0.20 |

*Example 2.—Production of an aluminum silicon eutectic*

85% of a crude alloy with 31.5% silicon and the residue consisting of aluminum together with small quantities of iron and titanium were, for the purpose of obtaining the eutectic according to the present invention, subjected to fractional crystallization within a temperature range of 840° to 591° C. The final temperature reached in this process measured in the bath was about 14° above that of the eutectic in question.

The fractional crystallization was effected in a crucible the outer walls of which were surrounded by a copper coil traversed by alternating current of 50 cycles per second. By regulation of the intensity of the current there was set up such a strong magnetic field in the interior of the crucible that the metal bath was set in movement, performing 330 revolutions per minute. In order to avoid oxidation of the metal during treatment, the surface of the bath was covered with 3 kilograms of a salt melt consisting of 28 mol per cent barium chloride, 39 mol per cent potassium chloride and 33 mol per cent sodium chloride.

During the entire process which lasted for 58 minutes 14,400 calories were abstracted from the melt through the bottom of the crucible, the melt being additionaly heated by a hot body arranged above the bath to such an extent that the speed of cooling of the bath amounted to about 4.3° C. per minute. Under these conditions there resulted a difference of 14° C. between the temperature of the melt and that of the cooling walls of the bottom of the crucible.

After reaching the final temperature of 591° C. the current which produced the movement of the bath was interrupted; the residual melt was poured from the crucible, and the crystal layer deposited on the bottom of the crucible was loosened by knocking the bottom and removed. The amount of the eutectic obtained containing 12.9% silicon and the residue aluminum was 61 kgs., that is, 71.8% of the initial alloy, i. e. considerably more than was obtained by any other separating process during a disproportionately longer period of operation.

What is claimed is:

1. Process of separating an alloy adapted to be separated by fractional crystallization comprising the steps of preparing a melt of said alloy; then cooling a surface portion of said melt without cooling the remainder thereof; and simultaneously therewith keeping said melt in constant movement so as to maintain a substantially uniform temperature and uniform melt composition throughout said remainder of said melt, and to cause an abrupt temperature drop between said remainder of said melt and said cooled surface portion, thus restricting the ensuing crystallization to said cooled surface portion.

2. Process of separating an alloy adapted to be separated by fractional crystallization comprising the steps of preparing a melt of said alloy; then cooling a surface portion of said melt; and simultaneously therewith heating the remainder of said melt and keeping it in constant movement so as to maintain a substantially uniform temperature and uniform melt composition throughout the remainder of said melt, and to cause an abrupt temperature drop between said remainder of said melt and said cooled surface portion, thus restricting the ensuing crystallization to said cooled surface portion.

ALBERT REGNER.

REFERENCES CITED

The following references are of record in the file of this patent:

UNITED STATES PATENTS

| Number | Name | Date |
|---|---|---|
| 1,831,023 | Mathiew et al. | Nov. 10, 1931 |

FOREIGN PATENTS

| Number | Country | Date |
|---|---|---|
| 540,536 | Great Britain | Oct. 21, 1941 |